United States Patent [19]

Yamamoto et al.

[11] Patent Number: 4,999,402
[45] Date of Patent: Mar. 12, 1991

[54] METHACRYLIC ACID ESTER RESIN COMPOSITION

[75] Inventors: Sumio Yamamoto, Takasago; Shinichi Sakurai, Suita, both of Japan

[73] Assignee: Kanegafuchi Kagaku Kogyo Kabushiki Kaisha, Osaka, Japan

[21] Appl. No.: 240,659

[22] Filed: Sep. 6, 1988

[30] Foreign Application Priority Data

Sep. 7, 1987 [JP] Japan ............................. 62-224704

[51] Int. Cl.$^5$ ........................................... C08F 265/04
[52] U.S. Cl. ..................... 525/305; 525/308; 525/309
[58] Field of Search ..................... 525/305, 308, 309

[56] References Cited

U.S. PATENT DOCUMENTS

| | | | |
|---|---|---|---|
| 3,450,796 | 6/1969 | Griffin | 525/309 |
| 3,812,205 | 5/1974 | Dunkelberger | 260/885 |
| 3,992,485 | 11/1976 | Kosugi et al. | 260/881 |
| 4,052,525 | 10/1977 | Ide et al. | 428/412 |
| 4,115,480 | 9/1978 | Kinoshita et al. | 260/885 |
| 4,155,899 | 5/1979 | Lemper et al. | 525/309 |
| 4,353,818 | 10/1982 | Maslanka et al. | 525/309 |

FOREIGN PATENT DOCUMENTS

| | | | |
|---|---|---|---|
| 47-13371 | 4/1972 | Japan . | |
| 50-9022 | 4/1975 | Japan . | |
| 0200412 | 12/1982 | Japan | 525/309 |
| 1374839 | 11/1974 | United Kingdom . | |

Primary Examiner—Lewis T. Jacobs
Assistant Examiner—Karen A. Helleider
Attorney, Agent, or Firm—Armstrong, Nikaido, Marmelstein, Kubovcik & Murray

[57] ABSTRACT

A methacrylic acid ester composition comprising 10 to 50 parts by weight of a cross-linked acrylic acid ester elastomer (A) and 50 to 90 parts by weight of a resin component, the total amount of the elastomer (A) and the resin component being 100 parts by weight; which is prepared by (a) preparing the cross-linked acrylic acid ester elastomer (A) by emulsion-polymerization,
(b) adding a monomer component (B) to the elastomer (A) in the emulsion, and
(c) polymerizing a monomer mixture (2) in the presence of the elastomer (A) to give the resin component.

The composition is excellent in the processability and can provide the film having the excellent transparency, weatherability, flexbility and whitening resistance to hot water.

11 Claims, No Drawings

METHACRYLIC ACID ESTER RESIN COMPOSITION

BACKGROUND OF THE INVENTION

The present invention relates to a polymethacrylic acid ester (hereinafter referred to as "methacrylate") resin composition which is excellent in processibility and is capable of providing a film having excellent weatherability, transparency, flexibility and resistance to whitening upon contact with hot water, and a process for preparation thereof. More particularly, the present invention relates to a cross-linked polyacrylic acid ester (hereinafter referred to as "acrylate") elastomer-containing polymethacrylate resin composition comprising a grafted elastomer having a graft polymer and a free polymer (in the instant specification, the part which is grafted on the elastomer (A) is defined as a "graft polymer" and a copolymer wherein the graft polymer has been grafted on the elastomer (A) is defined as a "grafted elastomer"), produced by graft-polymerizing a monomer mixture comprising mainly a methacrylate in the presence of a cross-linked acrylate elastomer (A) mainly composed of an acrylate, in which the component ratio of the graft polymer of the grafted elastomer is substantially the same as that of the free polymer [hereinafter, the components used for preparing the graft part of the grafted elastomer and the free polymer, that is, the mixture to be added to the elastomer (A) for preparing the graft polymer and free polymer (resin component) are referred to as a "monomer component (B)"], and a process for preparing the composition.

Methacrylate resins are remarkably excellent in weatherability and transparency compared with other plastic resins. So, they are widely used in various fields such as the industrial field. For example, methacrylate resins are formed into sheets, films, and the like and they are laminated on various materials, such as plastics, woods and metals, to prevent deterioration of the materials, to keep their good appearance, and the like.

However, methacrylate resins are rigid and brittle. Therefore, various means have been proposed for improving these deficiencies.

In order to improve film-moldability and impact resistance of the films prepared from the methacrylate resins, there have been proposed various methods, e.g. a method in which a rubber component is dispersed in the methacrylate resin; a method in which in the graft-polymerization of a mixture of acrylate and methacrylate onto a rubber component, the percentage of the acrylate monomer in the monomer mixture is increased; a method in which components used for forming a graft polymer of the grafted elastomer and a free polymer is graft-polymerized in a multistage polymerization which improves the strength of the film (Japanese Unexamined Patent Publication No. 13371/1972, No. 9022/1975, and the like), and the like.

When the rubber component is mixed with, or dispersed in, the methacrylate resin for improving the above-mentioned deficiencies, generally, it is common to use a method in which monomers used for obtaining the methacrylate resin are graft-polymerized in the presence of the rubber for obtaining good compatibility of the methacrylate resin with the rubber.

As rubbers, there are preferably used an unsaturated rubber such as a butadiene rubber from the viewpoint of the improvement of the impact resistance. However, a saturated rubber, such as an acrylic rubber, is usually used as the rubber from the viewpoint of maintaining excellent weatherability, which is a feature of the methacrylate resin. The smaller the particle size of the rubber, the better the transparency but this lowers the impact resistance. Accordingly, the particle size of the rubber is suitably determined according to the use to which the product will be put.

In the case of the graft-polymerization of monomers used for obtaining methacrylate resins in the presence of the rubber, in order to improve entanglement adhesion between the rubber part and the graft polymer of the grafted elastomer and to change physical properties, such as refractive index, more continuously there have been proposed multistage polymerization methods such as a four-stage polymerization (Japanese Examined Patent Publication No. 13371/1972) and a three-stage polymerization (Japanese Examined Patent Publication No. 9022/1975), and the like. However, the multistage polymerization methods have dificiencies in that the manufacturing steps become complicated with an increase of the number of the steps. Also, when introducing a soft intermediate component between the rubber component and the graft polymer, it becomes difficult to obtain films having excellent whitening resistance to hot water.

Also, since the methacrylate resins have relatively high in hygroscopicity, the resins are easily whitened due to absorption of moisture when the films made from the resins are dipped in warm water or when the outdoor temperature rises after raining in case of using the films outdoors. Particularly, where the films are transparent, the transparency, which is the feature of the methacrylate resin, of the film is lowered, which remarkably impairs the value of the films in commerce.

For solving the above-mentioned defects, there has hitherto been studied, for instance, a method in which a hydrophobic monomer such as cyclohexyl methacrylate is used, a method, in which the graft ratio is increased for improving the adhesion between the rubber component and the graft polymer, a method in which a substance having water repellency or hydrophobic property, such as a silicon compound or a plasticizer, is kneaded with the methacrylate resin, thereby preventing the whitening of the film caused by absorbing warm water, or decreasing absorption of warm water. However, sufficient results have not yet been obtained.

On the other hand, there has been described, in Japanese Examined Patent Publication Nos. 14267/1977, 33277/1979, and the like, a method in which methacrylate monomers are graft-polymerized in the presence of a rubber in one stage without using a chain transfer agent. In these methods, although in some cases that a film having excellent whitening resistance to hot water is made, the resin is not suitable for extrusion, at a high draw ratio, to form a film. Therefore, the processing methods are limited.

An object of the present invention is to provide a cross-linked acrylate elastomer-containing methacrylate resin composition which can be converted into a film having excellent weatherability, transparency, flexibility and resistance to whitening when immersed in hot water, and which can be stably formed by extrusion, at a high draw ratio, into thin films having the above-mentioned excellent properties.

An another object of the present invention is to provide a process for efficiently preparing a methacrylate resin composition having excellent processability and capable of providing a film having excellent properties such as weatherability, transparency, flexibility and resistance to whitening upon contact with hot water.

These and other objects of the present invention will become apparent from the following description.

SUMMARY OF THE INVENTION

It has now been found that when a monomer mixture containing mainly methacrylate monomers is added to an acrylic rubber in the presence of a chain transfer agent in one-stage and the amount of the methacrylate is not less than 60% by weight, a resin composition having excellent processability and capable of providing a film, having excellent weatherability, transparency, flexibility and resistance to whitening in hot water, can be obtained.

Also, it has now been found that, when a chain transfer agent is used in a small amount during the graft-polymerization, there can be obtained a resin composition having excellent processability and capable of providing a film having excellent properties such as weatherability, transparency, flexibility and whitening resistance to whitening in hot water by an effecient polymerization method such that the monomer mixture containing mainly the methacrylate, is graft-polymerized in the presence of the rubber in one stage.

That is, in accordance with the present invention, there is provided a methacrylic acid ester resin composition comprising 10 to 50 parts by weight of an elastomer (A) and 50 to 90 parts by weight of a resin component, the total amount of the elastomer (A) and the resin component being 100 parts by weight; which is prepared by (a) preparing the cross-linked acrylic acid ester elastomer (A) by emulsion-polymerization,
(b) adding a monomer component (B) to the elastomer (A) in the emulsion, and
(c) polymerizing a monomer mixture (2) in the presence of the elastomer (A) to give the resin component;

the elastomer (A) being prepared from a mixture comprising a monomer mixture (1) comprising not less than 60% by weight of an alkyl acrylate (i) in which the alkyl group has 1 to 8 carbon atoms and not more than 40% by weight of an alkyl methacrylate (ii) in which the alkyl group has 1 to 4 carbon atoms, and 0.1 to 20% by weight, based on the monomer mixtures (1), of a polyfunctional monomer copolymerizable with the acrylate (i) and the methacrylate (ii) having not less than 2 non-conjugated double bonds per one molecule, and the monomer component (B) comprising a monomer mixture (2) comprising not less than 60% by weight of an alkyl methacrylate (iii) in which the alkyl group has 1 to 4 carbon atoms and not more than 40% by weight of an alkyl acrylate (iv) in which the alkyl group has 1 to 8 carbon atoms, and 0.01 to 10% by weight, based on the monomer mixture (2), of a chain transfer agent.

Also, in accordance with the present invention, there is provided an efficient process for preparing the above-mentioned methacrylate resin composition.

DETAILED DESCRIPTION

The methacrylate resin composition of the present invention is prepared by, firstly, obtaining the emulsion of the cross-linked acrylate elastomer (A), and secondly, copolymerizing a monomer mixture, used for forming resin component, in the presence of the emulsion of the elastomer (A).

In the present invention, the elastomer (A) comprises the monomer mixture (1) composed of 60 to 100% by weight of an alkyl acrylate (i), in which the alkyl group has 1 to 8 carbon atoms, and 0 to 40% by weight of an alkyl methacrylate (ii), in which the alkyl group has 1 to 4 carbon atoms, and 0.1 to 20% by weight of the monomer mixture (1) of a polyfunctional monomer copolymerizable with the acrylate (i) and the methacrylate (ii) having at least two non-conjugated double bonds in each molecule.

Examples of the alkyl acrylates (i) in which the alkyl group has 1 to 8 carbon atoms are, for instance, methyl acrylate, ethyl acrylate, propyl acrylate, butyl acrylate, 2-ethylhexyl acrylate, n-octyl acrylates, and the like. These alkyl acrylates can be used alone or as an admixture thereof.

The alkyl group in the alkyl acrylate (i) may be linear or branched. When the number of carbon atoms of the alkyl group in the acrylate (i) is more than 8, the reaction rate is slow.

Examples of the alkyl methacrylate (ii) in which the alkyl group has 1 to 4 carbon atoms are, for instance, methyl methacrylate, ethyl methacrylate, propryl methacrylate, butyl methacrylate, and the like. These alkyl methacrylates can be used alone or as an admixture thereof.

The alkyl group in the alkyl methacrylate (ii) may be linear or branched. When the number of the carbon atoms of the alkyl group in the methacrylate (ii) is more than 4, the reaction rate is slow.

The monomer mixture (1) is composed of 60 to 100% by weight, preferably 75 to 95% by weight, of the alkyl acrylate (i) and 0 to 40% by weight, preferably 5 to 25% by weight, of the alkyl methacrylate (ii). The amounts of the alkyl acrylate (i) and the alkyl methacrylate (ii) are decided from the viewpoint that when the amounts are within the above ranges, the glass transition temperature of the elastomer (A) is below about 0° C., the compatibility of the elastomer (A) with the monomer component (B) is excellent and soft and flexible films can be obtained.

In the invention, the polyfunctional monomer copolymerizable with the acrylate (i) and the methacrylate (ii) having at least two non-conjugated double bonds per molecule is used as a cross-linking agent or graft-linking agent.

The polyfunctional monomer is mainly used for cross-linking the monomer mixture (1) to give the cross-linked elastomer (A). Examples of polyfunctional monomers are, for instance, methacrylic esters such as ethylene glycol dimethacrylate, diethylene glycol dimethacrylate, triethylene glycol dimethacrylate, trimethylolpropane trimethacrylate and dipropylene glycol dimethacrylate; acrylic esters such as ethylene glycol diacrylate, diethylene glycol diacrylate, triethylene glycol diacrylate, trimethylolpropane triacrylate and dipropylene glycol diacrylate; vinyl group-containing polyfunctional monomers such as divinylbenzene and divinyl adipate; allyl group-containing polyfunctional monomers such as diallyl phthalate, diallyl maleate, allyl acrylate, allyl methacrylate, triallyl cyanurate and triallyl isocyanurate; and the like.

The allyl group-containing polyfunctional monomers are slow in their reaction rate, and some of the double bonds remain in the elastomer (A) after the preparation of the elastomer (A) is completed. Therefore, it is considered that the double bonds promote the graft-polymerization of the monomer mixture (2) onto the elastomer (A).

The polyfunctional monomer exerts an influence on the degree of cross linking in the elastomer (A) and the graft ratio of the monomer mixture (2).

The degree of cross-linking exerts an influence on the properties of the cross-linked elastomer (A) [the gel percentage of the product showing a degree of entanglement of graft polymer with the elastomer.] The lower the degree of cross-linking, the lower the degree of entanglement, and the compatibility of the resin component with the elastomer (A) is lowered and the transparency, stress whitening resistance and flow processing stability are lowered. The higher the degree of cross-linking, the better the transparency and surface gloss of the films, but in such a case, the impact resistance and the processibility in the elongation at around the processing temperature are lowered.

The amount of the polyfunctional monomer which gives the most suitable degree of cross-linking to the elastomer (A) is from 0.1 to 20% by weight, preferably from 0.5 to 5% by weight, more preferably from 0.5 to 1.7% by weight of the monomer mixture (1). When the amount of the polyfunctional monomer is less than 0.1% by weight, the compatibility of the elastomer (A) with the resin component composed of the graft polymer and the like, and the properties such as the transparency, surface gloss, stress whitening resistance and film forming stability are lowered. On the other hand, when the amount is more than 20% by weight, the elongation and impact resistance of the film are lowered.

In accord with the invention, the monomer mixture (1) may further include an ethylenically unsaturated monomer copolymerizable with the acrylate (i) and the methacrylate (ii) so long as the content of the alkyl acrylate (i) in the monomer mixture (1) is not less than 60% by weight.

Examples of such ethylenically unsaturated monomers are, for instance, a halogenated vinyl compound such as vinyl chloride or vinyl bromide; a vinyl cyanide compound such as acrylonitrile or methacrylonitrile; a vinyl ester compound such as vinyl acetate or vinyl propionate; an aromatic vinyl compound such as styrene or α-methyl styrene; an aromatic vinyl derivative such as o-chlorostyrene or m-chlorostyrene; a halogenated vinylidene compound such as vinylidene chloride or vinylidene fluoride; acrylic acid, a salt thereof such as sodium acrylate or an acrylate derivative such as acrylamide; a methacrylic acid, a salt thereof such as sodium methacrylate or a methacrylate derivative such as methacrylamide; and the like.

The ethylenically unsaturated monomer is used in an amount of, preferably not more than 20% by weight, more preferably not more than 10% by weight of the monomer mixture (1).

The elastomer (A) used in the present invention is prepared by polymerizing the mixture comprising the monomer mixture (1) composed of the alkyl acrylate (i), the alkyl methacrylate (ii), and if necessary, the ethylenically unsaturated monomer, and the polyfunctional monomer copolymerizable with the acrylate (i) and the methacrylate (ii) having at least two non-conjugated double bonds per molecule, in, for instance, an emulsion polymerization.

In the above-mentioned emulsion polymerization, usual polymerization initiators, especially polymerization initiators capable of producing free radicals, are used. Examples of the initiators are, for instance, inorganic peroxides such as potassium persulfate and sodium persulfate, organic peroxides such as cumene hydroperoxide and benzoyl peroxide, oil-soluble polymerization initiators such as azobisisobutyronitrile, and the like.

These polymerization initiators can be used in the form of a redox polymerization initiator in which the above-mentioned initiator is combined with a reducing agent such as sodium sulfite, sodium thiosulfate, sodium formaldehyde sulfoxylate, ascorbic acid or ferrous sulfate.

In the above-mentioned emulsion polymerization, used surface active agents are not limited and surface active agents usually used in emulsion polymerization can be used. Examples of the surface active agents are, for instance, anionic surface active agents such as sodium alkylsulfate, sodium alkylbenzenesulfonate or sodium laurate, nonionic surface active agents such as the reaction product of an alkyl phenol with ethylene oxide, and the like. These surface active agents are used alone or as an admixture thereof. If necessary, a cationic surface active agent such as alkylamine hydrochloride can be used.

An aqueous dispersion medium used in the emulsion polymerization is not particularly limited in its amount. Usually, the aqueous dispersion medium is used in the amount of about 60 to about 400 parts by weight based on 100 parts by weight of the monomers, or the total amount of the monomers and the polymers. It is preferable that the amount of the aqueous dispersion medium is from 80 to 250 parts by weight based on 100 parts by weight of the monomers or the total of the monomers and polymers from the viewpoints of the economy, and the like.

It is preferable that the average particle size of the thus prepared elastomer (A) is made within the range from 400 to 2000 Å by controlling the amount of the surface active agent and the amount of the aqueous dispersion medium used. When the average particle size of the elastomer (A) is less than 400 Å, the impact resistance of the films produced tends to be lower, and when the average particle size is more than 2000 Å, the transparency of the films tends to be lower.

The methacrylate resin composition of the present invention is composed of 10 to 50 parts by weight, preferably from 20 to 40 parts by weight, of the elastomer (A) and 50 to 90 parts by weight, preferably from 60 to 80 parts by weight, of the resin component, the total amount of the elastomer (A) and the resin component being 100 parts by weight. In the present invention, the monomer component (B) is added to the elastomer (A) in the emulsion and the monomers are polymerized in the presence of the elastomer (A) to give the methacrylate resin composition desired product. The monomer component (B) is composed of the monomer mixture (2) comprising 60 to 100% by weight, preferably from 80 to 100% by weight, more preferably from 90 to 100% by weight, especially from 92 to 100% by weight, of the alkyl methacrylate (iii) in which the alkyl group has 1 to 4 carbon atoms; and 0 to 40% by weight, preferably from 0 to 20% by weight, more preferably 0 to 10% by weight, especially from 0 to 8% by weight, of the alkyl acrylate (iv) in which the alkyl group has 1 to 8 carbon atoms; and 0.01 to 10% by weight, preferably from 0.05 to 1% by weight, based on the monomer mixture (2), of the chain transfer agent.

The amounts of the alkyl methacrylate (iii) and the alkyl acrylate (iv) in the monomer mixture (2) is determined in consideration of the compatibility thereof with the elastomer (A) and the properties of the obtained methacrylate resin composition. When the amount of the alkyl methacrylate (iii) is less than 60% by weight, the hardness and softening temperature are lowered and problems, such as occurance of blocking, arise. Also, when the amount of the alkyl methacrylate (iii) is not less than 90% by weight, the obtained film has the especially excellent resistance to whitening in hot water.

The same alkyl acrylate and alkyl methacrylate as those used in the preparation of the elastomer (A) can be used as the methacrylate (iii) and the acrylate (iv) in the monomer mixture (2).

When the amount of the elastomer (A) is less than 10 parts by weight, the impact resistance and flexibility of the obtained resin composition are unsatisfactory. When the amount of the elastomer (A) is more than 50 parts by weight, the resistance to whitening in hot water, hardness and softening temperature are lowered, and it is more difficult to stably form the resin composition into the film by extrusion using a high draw ratio.

The monomer mixture (2) may contain ethylenically unsaturated monomers copolymerizable with the methacrylate (iii) and the acrylate (iv) which are the same monomers as used in the monomer mixture (1), as mentioned above, so long as the content of the methacrylate (iii) is not less than 60% by weight.

In the polymerization of the monomer component (B) in the presence of the elastomer (A), the degree of chemical and physical bonding of the resin component to the elastomer (A) is important. The degree of bonding of the resin component to the elastomer (A) can be controlled by the kinds or amounts of the polyfunctional monomers or the chain transfer agents or the polymerization conditions. When the degree of bonding is too low, the compatibility of the resin component with the elastomer (A) is lowered, so the transparency and flow processing stability are lowered. On the other hand, when the degree of bonding is too high, the processibility is lowered though the transparency and stress whitening resistance are improved.

The methacrylate resin composition of the present invention is prepared, for instance, by adding the monomer component (B) composed of the monomer mixture (2) comprising the methacrylate (iii), the acrylate (iv) and, as occasion demands, the ethylenically unsaturated monomer, and the chain transfer agent, to the emulsion containing the elastomer (A), and polymerizing the monomer mixture (2) in the presence of the elastomer (A) so that the obtained resin component is composed of graft polymer and free polymer.

In the copolymerization, the chain transfer agent is used in an amount of 0.01 to 10% by weight, preferably 0.05 to 1% by weight, of the monomer mixture (2). When the amount of the chain transfer agent is less than 0.01% by weight, the graft ratio is too high, the elongation at high temperature is lowered, and the processibility is lowered. On the other hand, when the amount of the chain transfer agent is more than 10% by weight, the graft ratio is too low, the compatibility of the resin component with the elastomer (A) is lowered, and the transparency of the film is lowered. Moreover, with such an increase of the amount of the chain transfer agent the product has an extraordinarily bad smell.

As the chain transfer agent used in the present invention, chain transfer agents selected from those usually used in radical polymerization are preferable. Examples of the chain transfer agents are, for instance, alkyl mercaptans having 2 to 20 carbon atoms, mercapto-group-containing acids, thiophenols, carbon tetrachloride, and the like. They may be used alone or as an admixture thereof.

When copolymerizing the monomer component (B) in the presence of the elastomer (A), the polymerization means is not limited, and the copolymerization can be suitably conducted so long as the resin component in the obtained composition is composed of a graft polymer of the grafted elastomer and the free polymer. It is preferable to continuously add the monomer component (B) to the emulsion of the elastomer (A) in one stage to polymerize. It is preferable that the component ratio of the graft polymer to the resin component is the same as that of the free polymer to the resin component. In such a case, the obtained film is remarkably difficult to deform when dipping it in hot water, the water absorption of the film is remarkably improved and the resistance to whitening in hot water is remarkably improved.

For obtaining the resin component wherein the component ratio of the grafted part is substantially the same as that of the free polymer, the monomer component (B) is continuously added to the emulsion of the elastomer (A) without changing the component ratio of the monomer component (B).

The methacrylate resin composition can be obtained from the thus obtained polymer latex by, for instance, usual coagulation using, e.g. a salt and washing, spraying, lyophilizing, or the like.

In the thus obtained methacrylate resin composition of the present invention, it is preferable that the graft polymer is formed from 5 to 58% by weight, more preferably from 10 to 55% by weight of the monomer mixture (2) and the free polymer is formed from 95 to 42% by weight, more preferably from 90 to 45% by weight of the monomer mixture (2). When the above amount of the monomer mixture (2) is more than 58% by weight, the processibility under high draw ratio tends to be lower, on the other hand, when the above amount is less than 5% by weight, the transparency tends to be lower.

The methacrylate resin composition of the present invention is processed by means of the usual melt extrusion, tubular film process, T-die process or calendering to give a film having excellent processability under high draw ratio, weatherability, transparency, flexbility and resistance to hot water whitening, and the like.

The methacrylate resin composition of the invention may include the usual additives, such as organic or inorganic pigments or dyes for coloring, antioxidants or ultraviolet absorbers for increasing the stability to heat or light, and the like.

The present invention is more specifically described and explained by means of the following Examples and Comparative Examples in which all % and parts are by weight unless otherwise noted. It is to be understood that the present invention is not limited to the Examples and Comparative Examples, and various changes and modifications may be made in the invention without departing from the spirit and scope thereof.

EXAMPLES 1 TO 4

An 8 l polymerization vessel, equipped with a stirrer, a thermometer, an introducing tube for nitrogen gas, a supplying tube for monomers and a reflux condenser, was charged with 200 parts (4 kg) of deionized water, 1.0 part of sodium dioctyl sulfosuccinate and 0.5 part of sodium formaldehyde sulfoxylate. The space in the vessel was thoroughly displaced with nitrogen gas with stirring and the inner temperature of the vessel was adjusted to 60° C.

To the vessel was continuously added a mixture of 24 parts of butyl acrylate (hereinafter referred to as "BA"), 6 parts of methyl methacrylate (hereinafter referred to as "MMA"), 0.2 part of triallyl isocyanurate and 0.06 part of cumene hydroperoxide over about 2 hours while maintaining the inner temperature of the vessel at 60° C. After completing the addition, the reaction was continued for about 30 minutes to achieve a conversion of not less than 98%. The obtained elastomer (A) had an average particle size of 500 Å.

To the vessel was continuously added 70 parts of a monomer mixture (2) of MMA and BA having weight percentages of MMA and BA in the monomer mixture (2) in the resin component (B) shown in Table 1, 0.5 part of cumene hydroperoxide as a polymerization initiator and 0.15 part of t-dodecyl mercaptan as a chain transfer agent over about 4 hours while maintaining the inner temperature at 60° C. After completing the addition, the reaction was continued for about 1 hour to achieve a conversion of not less than 98%.

The obtained latex was salted-out, coagulated, and subjected to heat-treatment, cooling, dehydration, washing and drying in the usual manner to give a resin composition.

After 2 parts of an ultraviolet absorber (commercially available under the trade name "Tinuvin P" made by Ciba-Geigy AG.) was added to 100 parts of the obtained composition, the composition was pelletized.

From the pellets, transparent films having thicknesses of 40 μm and 50 μm were respectively prepared by using a T die having a die temperature of 240° C.

Average thickness and precision of the film are shown in Table 1.

Graft ratio, T-die processability of the composition, resistance to hot water whitening, weatherability, transparency and elongation of the film were measured as follows. [Graft ratio]

After 1 g of the resin composition is added to 50 ml of methyl ethyl ketone to dissolve and disperse the composition, insoluble matter is separated from soluble matter by using a centrifuge at 30,000 rpm for 2 hours. The insoluble matter is thoroughly dried under vacuum and the dried insoluble matter is weighed. The weight of the insoluble matter is regarded as "the weight of the grafted elastomer". Graft ratio (%) is calculated according to the following formula.

Graft ratio (%) =

$$\frac{[\text{The weight of grafted elastomer}] - [\text{The weight of the elastomer (A) in 1 g of the resin composition}]^*}{[\text{The weight of the elastomer (A) in 1 g of the resin composition}]^*} \times 100$$

*The weight of the elastomer (A) is a calculated value.

[Transparency]

With respect to the film (thickness: 50 μm), a total light transmittance is measured by using a haze meter made by Nippon Denshoku Kogyo Kabushiki Kaisha. [T-die Processability]

The resin composition is extruded by using a T die having a width of 32 mm and the film is stretched at a draw ratio of 10 and the thickness of the stretched film is measured. The draw ratio is determined according to the following formula:

$$\text{Draw ratio} = \frac{\text{Length of film upon drawing (per hour)}}{\text{Length of film upon non-drawing (per hour)}}$$

As to the obtained stretched film, the maximum thickness (Tmax), the minimum thickness (Tmin) and the average thickness (Tave) are measured. A percentage of the difference between Tmax and Tmin to Tave is calculated.

$$\frac{T\text{max} - T\text{min}}{T\text{ave}} \times 100 \ (\%)$$

The processibility is estimated as follows:
The percentage is less than 5%: Excellent
The percentage is from 5 to 20%: Good
The percentage is more than 20%: Poor
[Resistance to hot water whitening]

After the film (thickness: 50 μm) is dipped in hot water at 90° C. for 4 hours, the film is dipped in distilled water at room temperature to cool down it to room temperature. Then, the film is taken out of the distilled water, and the water on the film surface is wiped off with gauze. The appearance of the film is observed wth the naked eye and its total light transmittance (%) is measured by using a haze meter made by Nippon Denshoku Kogyo Kabushiki Kaisha (wave length: 550 μm). The appearance of the film is ranked as follows:
⊙: The film is not whitened at all.
O: The film is hardly whitened.
O−Δ: The film is slightly whitened.
Δ: The film is considerably whitened.
X: The film is extremely whitened.
[Elongation]

Elongation of the film is measured according to Japanese Industrial Standard (JIS) K 6732. [Weatherability]

The film (thickness: 50 μm) is subjected to accelerated weathering test by using a sunshine weather-O-meter made by Suga Shikenki Kabushiki Kaisha under conditions of a black-panel temperature of 83° C. and irradiation time of 1,000 hours. Then, tensile strength is measured according to JIS K 6732 and retention ratio, of the tensile strength of the film subjected to accelerated weathering test to that of the original film, is calculated. Also, it is observed whether the film is changed in its appearance and color with the naked eye.

The films (thickness: 50 μm) was laminated on a polycarbonate plate (hereinafter referred to as "PC plate") by pressing with heat at 180° C.

As to the film on the PC plate, the accelerated weathering test is conducted in the same manner as above, and the difference between the color of the original film and that of the film after the test (color difference, ΔE) is measured by using a color-difference meter (commercially available under the trade name "Z-80" made by Nippon Denshyoku Kabushiki Kaisha). The difference is shown in Table 1 as weatherability of the film-laminated PC plate.

COMPARATIVE EXAMPLE 1

The procedure of Example 2 was repeated except that the chain transfer agent was not used to give a resin composition. The composition was pelletized and films having thicknesses 40 μm and 50 μm were prepared in the same manner as in Example 2. However, there could not be obtained films having uniform film thickness.

TABLE 1

| | Weight percentage of MMA or BA in the monomer mixture(2) (%) | | Resistance to hot water whitening | | T-die processability | Average film thickness and fluctuation of film thickness (μm) |
|---|---|---|---|---|---|---|
| | MMA | BA | Appearance of film | Total light transmittance (%) | | |
| Ex. No. | | | | | | |
| 1 | 95 | 5 | | 90 | Excellent | 50 ± 2 |
| | | | | | | 40 ± 4 |
| 2 | 92 | 8 | | 85 | " | 50 ± 2 |
| | | | | | | 40 ± 4 |
| 3 | 90 | 10 | -Δ | 80 | " | 50 ± 2 |
| | | | | | | 40 ± 6 |
| 4 | 85 | 15 | | 62 | " | 50 ± 4 |
| | | | | | | 40 ± 8 |
| Com. Ex. | | | | | | |
| 1 | 92 | 8 | - | 87 | Poor | 50 ± 24 |
| | | | | | | 40 ± 38 |

| | | Weatherability | | | | |
|---|---|---|---|---|---|---|
| | Transparency (%) | Retention of tensile strength (%) | Change in appearance and color | Weatherability of the film-laminated PC plate (ΔE) | Elongation (%) | Graft ratio (%) |
| Ex. No. | | | | | | |
| 1 | 92.3 | 98 | The film was hardly changed | 0.8 | — | — |
| 2 | 92.2 | 98 | The film was hardly changed | 0.9 | 101 | 96 |
| 3 | 92.2 | 98 | The film was hardly changed | 1.0 | — | — |
| 4 | 92.2 | 96 | The film was hardly changed | 1.2 | — | — |
| Com. Ex. | | | | | | |
| 1 | 92.1 | 98 | The film was hardly changed | 1.0 | — | — |

As is evident from the results shown in Table 1, it is especially preferable to contain not less than 85%, more preferably not less than 90%, especially not less than 92% of the alkyl methacrylate in the monomer mixture (2) for obtaining the excellent resistance to hot water whitening.

When the PC plate was not laminated with the film prepared from the composition of the invention, ΔE of the PC plate was 15. From the results shown in Table 1, it would be confirmed that the film prepared from the composition of the invention has excellent effect for preventing change of color of the PC plate when laminating the film on the PC plate.

COMPARATIVE EXAMPLES 2 TO 4

The monomer mixture (2) of MMA and BA was added to the elastomer (A) in two stages.

That is, the elastomer (A) was prepared in the same manner as in Example 1.

To the vessel, firstly, was continuously added a mixture of 20 parts of a monomer mixture of MMA and BA having weight percentages of MMA and BA shown in the First stage of Table 2, 0.04 part of cumene hydroperoxide and 0.02 part of t-dodecyl mercaptan over about 1 hour. The reaction system was stirred for about 30 minutes after completing the addition. Secondly, to the reaction system was continuously added a mixture of 50 parts of a monomer mixture of MMA and BA having a weight percentage of MMA and BA shown in the Second stage of Table 2, 0.36 part of cumene hydroperoxide and 0.11 part of t-dodecyl mercaptan over about 3 hours. After completing the addition, the reaction was continued for about 1 hour to achieve a conversion of not less than 98%. During the above reactions in two stages, the inner temperature was maintained at 60° C.

The procedure of Example 1 was repeated except that the obtained latex was used to give a composition. Then, the composition was pelletized and the pellets were formed into a film having a thickness of 50 μm through the T-die in the same manner as in Example 1.

As to the obtained film, resistance to hot water whitening and other properties of the film were measured in the same manner as in Example 1. The results are shown in Table 2.

TABLE 2

| Com. Ex. No. | Weight percentage of MMA or BA in the monomer mixture (2) | | | | Resistance to hot water whitening | | T-die processability |
|---|---|---|---|---|---|---|---|
| | First stage (%) | | Second stage (%) | | Appearance of film | Total light transmittance (%) | |
| | MMA | BA | MMA | BA | | | |
| 2 | 50 | 50 | 95 | 5 | X | 25 | Excellent |
| 3 | 60 | 40 | 95 | 5 | X | 42 | " |
| 4 | 60 | 40 | 93 | 7 | X | 40 | " |

From the results shown in Table 2, it is confirmed that when the composition is prepared by adding the monomer mixture (2) to the latex of the elastomer (A) in two stages, the films obtained from the composition are inferior in the their resistance to hot water whitening compared to the films obtained in Examples 1 to 3.

TABLE 3

| | Weight percentage of BA or MMA in the monomer mixture in the elastomer (A) (%) | | Elongation (%) | Glass transition temperature (°C.) | Graft ratio (%) |
| --- | --- | --- | --- | --- | --- |
| | BA | MMA | | | |
| Ex. No. | | | | | |
| 5 | 100 | 0 | 77 | −54 | 94 |
| 2 | 80 | 20 | 101 | −34 | 96 |
| 6 | 60 | 40 | 56 | −10 | 98.5 |
| Com. Ex. | | | | | |
| 5 | 40 | 60 | 1 | 20 | 102 |

EXAMPLES 5 AND 6 AND COMPARATIVE EXAMPLE 5

A resin composition was prepared in the same manner as in Example 2 except that an elastomer (A) prepared from 30 parts of a mixture of MMA and BA having weight percentages of MMA and BA shown in Table 3 instead of the mixture of 24 parts of BA and 6 parts of MMA was used. The graft ratio was measured in the same manner as in Example 2. Then, the obtained composition was pelletized and the pellets were formed into a film having a thickness of 50 μm through the T-die in the same manner as in Example 2. The elongation of the film was measured in the same manner as in Example 2.

Glass transition temperature (Tg) of the obtained film was found according to the Fox's formula:

$$\frac{1}{Tg} = \frac{a_1}{Tg_1} + \frac{a_2}{Tg_2}$$

$a_1$: Weight ratio of BA to the mixture $a_2$: Weight ratio of MMA to the mixture $Tg_1$: Tg of polybutyl acrylate $Tg_2$: Tg of polymethyl methacrylate using numerical values described in Polymer Handbook edited by J. BRANDRUP E. H. IMMERGUT.

The results are shown in Table 3.

All of the films obtained in Examples 5 and 6 and Comparative Example 5 were excellent in the weatherability, transparency and resistance to hot water whitening.

It is required that films have an elongation of, usually, not less than 10%, preferably not less than 30%, though the elongation of the films vary depending on their use.

From the results shown in Table 3, it should be understood that when the percentage of the alkyl acrylate (BA) in the elastomer (A) becomes 40%, the elongation of the obtained film is remarkably lowered, and consequently, the film become brittle.

EXAMPLES 7 TO 9 AND COMPARATIVE EXAMPLES 6 AND 7

The procedure of Example 2 was repeated except that the amount of triallyl isocyanurate, as the polyfunctional monomer which was used for the preparation of the elastomer (A), was changed to amounts shown in Table 4 to give a resin composition. The graft ratio of the composition was measured in the same manner as in Example 2.

The obtained composition was pelletized and the pellets were formed into a film having a thickness of 50 μm in the same manner as in Example 2. Transparency and elongation of the film were measured in the same manner as in Example 2. The results are shown in Table 4.

The films obtained in Examples 7-9 were excellent in weatherability and resistance to hot water whitening.

TABLE 4

| | Amount of triallyl isocyanurate (parts) | Weight percentage of triallyl isocyanurate based on the mixture of MMA and BA in the elastomer (A) (%) | Transparency (%) | Elongation (%) | Graft ratio (%) |
| --- | --- | --- | --- | --- | --- |
| Ex. No. | | | | | |
| 7 | 0.03 | 0.1 | 91.5 | 50 | —* |
| 8 | 0.45 | 1.5 | 92.3 | 84 | 126 |
| 9 | 1.5 | 5 | 92.3 | 15 | 185 |
| Com. Ex. | | | | | |
| 6 | 0.015 | 0.05 | 82.0 | 46 | —* |
| 7 | 7.5 | 25 | 92.4 | 2 | 165 |

(Note)
*The graft ratio could not be measured (It would be considered that the graft ratio is nearly 0).

From the results shown in Table 4, it is confirmed that when the amount of triallyl isocyanurate as the polyfunctional monomer is less than 0.1% is the total amount of the monomers comprising the elastomer (A), the transparency of the film is remarkably lowered. That is, films having excellent transparency, such as those produced with not less than 90%, cannot be obtained. On the other hand, it is confirmed that when the amount of triallyl isocyanurate is over 20%, the elongation of the film is lowered, that is, the obtained film becomes brittle.

EXAMPLES 10 to 13 AND COMPARATIVE EXAMPLE 8

The procedure of Example 2 was repeated except that the amount of the elastomer (A) in the resin composition was changed to each amount shown in Table 5 to give a resin composition.

From the obtained composition, a film was prepared in the same manner as in Example 2. As to the film, elongation, resistance to hot water whitening and T-die precessibility were measured in the same manner as in Example 2. Also, hardness of the film surface was measured. The results are shown in Table 5. [Hardness of film surface]

The obtained films are laminated and the laminated film is pressed, with heat under pressure, to give a pressed plate having a thickness of 3 mm. Then, Rockwell hardness (R) of the pressed plate was measured according to JIS K 7202.

TABLE 5

| | Amount of the elastomer (A) (%) | Elongation (%) | Resistance to hot water whitening | T-die processibility | Hardness (R) |
|---|---|---|---|---|---|
| Ex. No. | | | | | |
| 10 | 10 | 10 | | Excellent | 120 |
| 11 | 20 | 62 | | Excellent | 114 |
| 12 | 40 | 123 | | Excellent | 83 |
| 13 | 50 | 140 | -Δ | Good | 48 |
| Com. Ex. | | | | | |
| 8 | 0 | 0 | | Excellent | 125 |

From the results shown in Table 5, it is confirmed that when the amount of the elastomer (A) is less than 10%, elongation of the obtained film is lowered, that is, the film becomes brittle. On the other hand, it would be confirmed that when the amount is more than 50%, resistance to hot warer whitening, hardness of the film surface and processibility are lowered.

EXAMPLES 14 to 17 AND COMPARATIVE EXAMPLES 9 AND 10

The procedure of Example 2 was repeated except that the amount of t-dodecyl mercaptan used as the chain transfer agent was changed to each amount shown in Table 6 to give a resin composition. Graft ratio of the resin composition was measured in the same manner as in Example 2. Then, the composition was formed into a film in the same manner as in Example 2. As to the obtained film, T-die processibility and transparency were measured in the same manner as in Example 2. The results are shown in Table 6.

TABLE 6

| | Amount of the chain transfer agent to the monomer mixture (2) (%) | T-die processibility | Transparency (%) | Graft ratio (%) |
|---|---|---|---|---|
| Ex. No. | | | | |
| 14 | 0.01 | Excellent | 92.2 | 129 |
| 15 | 0.05 | Excellent | 92.2 | 113 |
| 16 | 1 | Excellent | 91.5 | 53 |
| 17 | 10 | Excellent | 90.0 | 18 |
| Com. Ex. | | | | |
| 9 | 0 | Poor | 92.1 | 137 |
| 10 | 15 | Poor | 80.0 | 0.7 |

From the results shown in Table 6, it is confirmed that when the chain transfer agent is not used, precessability is poor. On the other hand, it is confirmed that when the amount of the chain transfer agent is not less than 15%, the transparency of the films lowers.

EXAMPLES 18 to 21 AND COMPARATIVE EXAMPLE 11

The procedure of Example 2 was repeated except that 70 parts of a monomer mixture (2) having weight percentages of MMA and BA shown in Table 7 was used to give a resin composition. A film is prepared from the obtained composition in the same manner as in Example 2. With respect to the film, Vicat softening temperature and blocking resistance were measured. The results are shown in Table 7. [Vicat softening temperature]

Vicat softening temperature is measured according to International Organization for Standardization (ISO) R-306 with a load of 5 kg in Examples 18–20 and Comparative Example 11 and with a load of 1 kg in Example 21. [Blocking resistance]

Blocking resistance was measured according to JIS Z 1515 at a temperature of 40° C. (Estimation)
O: No blocking occurs.
Δ: blocking slightly occurs.
X: blocking occurs.

TABLE 7

| | Weight percentage of MMA or BA in the monomer mixture (2) (%) | | Vicat softening temperature (°C.) | Blocking resistance | Graft ratio (%) |
|---|---|---|---|---|---|
| | MMA | BA | | | |
| Ex. No. | | | | | |
| 18 | 100 | 0 | 88 | | 92 |
| 19 | 90 | 10 | 72 | | 98 |

TABLE 7-continued

| | Weight percentage of MMA or BA in the monomer mixture (2) (%) | | Vicat softening temperature | Blocking | Graft ratio |
|---|---|---|---|---|---|
| | MMA | BA | (°C.) | resistance | (%) |
| 20 | 80 | 20 | 53 | ○ | 99.5 |
| 21 | 60 | 40 | 33 | △ | 102 |
| Com. Ex. | | | | | |
| 11 | 40 | 60 | —* | X | 105 |

(Note)
*The obtained pressed plate is too soft to measure the vicat softening temperature.

From the results shown in Table 7, it is confirmed that when the amount of MMA (alkyl methacrylate) in the monomer mixture (2) is less than 60%, the softening temperature of the film is so low that blocking occurs.

As shown above, the methacrylate resin composition is excellent in processibility, and there can be obtained from the methacrylate resin composition films having excellent weatherability, transparency, flexibility and resistance to hot water whitening.

In addition to the ingredients used in the Examples, other ingredients can be used as set forth in the specification to obtain substantially the same results.

What we claim is:

1. A resin composition comprising the product of a two stage emulsion polymerization, which product comprises:
    (A) 10 to 50 parts by weight, per 100 parts of said resin composition, of a crosslinked acrylic acid ester elastomer which was prepared by emulsion polymerizing a first monomer mixture (1) comprising not less than 60% by weight of an alkyl acrylate (i), having 1 to 8 carbon atoms in its alkyl group; not more than 40% by weight of an alkyl methacrylate (ii), having 1 to 4 carbon atoms in its alkyl group; and 0.1 to 20% by weight, based on the combined weight of said first monomer mixture (1), of a polyfunctional monomer having not less than 2 non-conjugated double bonds per one molecule, copolymerizable with said alkyl acrylate (i) and said alkyl methacrylate (ii); and
    (B) emulsion graft polymerized onto said elastomer, in the effective presence of 0.01 to 10% by weight, based on the weight of grafting monomers, of a chain transfer agent; 50 to 90 parts by weight, per 100 parts of said resin composition, of a monomer mixture of not less than 60% by weight of an alkyl methacrylate, having 1 to 4 carbon atoms in its alkyl group, and not more than 40% by weight of an alkyl acrylate having 1 to 8 carbon atoms in its alkyl group.

2. The composition of claim 1, wherein the amount of said polyfunctional monomer is from 0.5 to 5% by weight based on said monomer mixture (1).

3. The composition of claim 1, wherein the amount of said polyfunctional monomer is from 0.5 to 1.7% by weight based on said monomer mixture (1).

4. The composition of claim 1, wherein said monomer mixture (1) comprises 75 to 95% by weight of said alkyl acrylate (i) and 5 to 25% by weight of said alkyl methacrylate (ii).

5. The composition of claim 1, wherein the amount of said chain transfer agent is from 0.05 to 1% by weight based on said alkyl methacrylate (iii) and said alkyl acrylate (iv).

6. The composition of claim 1, wherein said monomer mixture (2) comprises 80 to 100% by weight of said alkyl methacrylate (iii) and 0 to 20% by weight of said alkyl acrylate (iv).

7. The composition of claim 1, wherein said monomer mixture (2) comprises 90 to 100% by weight of said alkyl methacrylate (iii) and 0 to 10% by weight of said alkyl acrylate (iv).

8. The composition of claim 1, wherein said monomer mixture (2) comprises 92 to 100% by weight of said alkyl methacrylate (iii) and 0 to 8% by weight of said alkyl acrylate (iv).

9. The composition of claim 1, which comprises 60 to 80 parts by weight of said resin component and 20 to 40 parts by weight of said elastomer (A).

10. A two step emulsion polymerization process for preparing a methacrylic acid ester composition which comprises:
    (a) preparing a cross-linked acrylic acid ester elastomer (A) by emulsion-polymerization;
    (b) adding 50 to 90 parts by weight of a monomer component (B) to 10 to 50 parts by weight of said elastomer (A) in the emulsion, the total amount of said elastomer (A) and said monomer component (B) being 100 parts by weight;
    (c) emulsion-polymerizing the monomer component (B) in the presence of the elastomer (A) so that the component ratio of the graft polymer of the grafted elastomer is the same as that of the free polymer; the elastomer (A) being prepared from a mixture comprising a monomer mixture (1) comprising not less than 60% by weight of an alkyl acrylate (i) in which the alkyl group has 1 to 8 carbon atoms and not more than 40% by weight of an alkyl methacrylate (ii) in which the alkyl group has 1 to 4 carbon atoms, and 0.1 to 20% by weight, based on the monomer mixtures (1), of a polyfunctional monomer copolymerizable with said acrylate (i) and said methacrylate (ii) having not less than 2 non-conjugated double bond per one molecular, and the monomer component (B) comprising a monomer mixture (2) comprising not less than 60% by weight of an alkyl methacrylate (iii) in which the alkyl group has 1 to 4 carbon atoms and not more than 40% by weight of an alkyl acrylate (iv) in which the alkyl group has 1 to 8 carbon atoms, and 0.01 to 10% by weight, based on the monomer mixture (2), of a chain transfer agent; and recovering the product of said two step emulsion polymerization.

11. The process of claim 10, wherein 50 to 90 parts by weight of said monomer component (B) is added continuously without changing the component ratio of said monomer component (B).

* * * * *